Jan. 16, 1962
J. R. WHITE
3,017,576
DUAL GAIN AMPLIFIER
Filed May 6, 1959
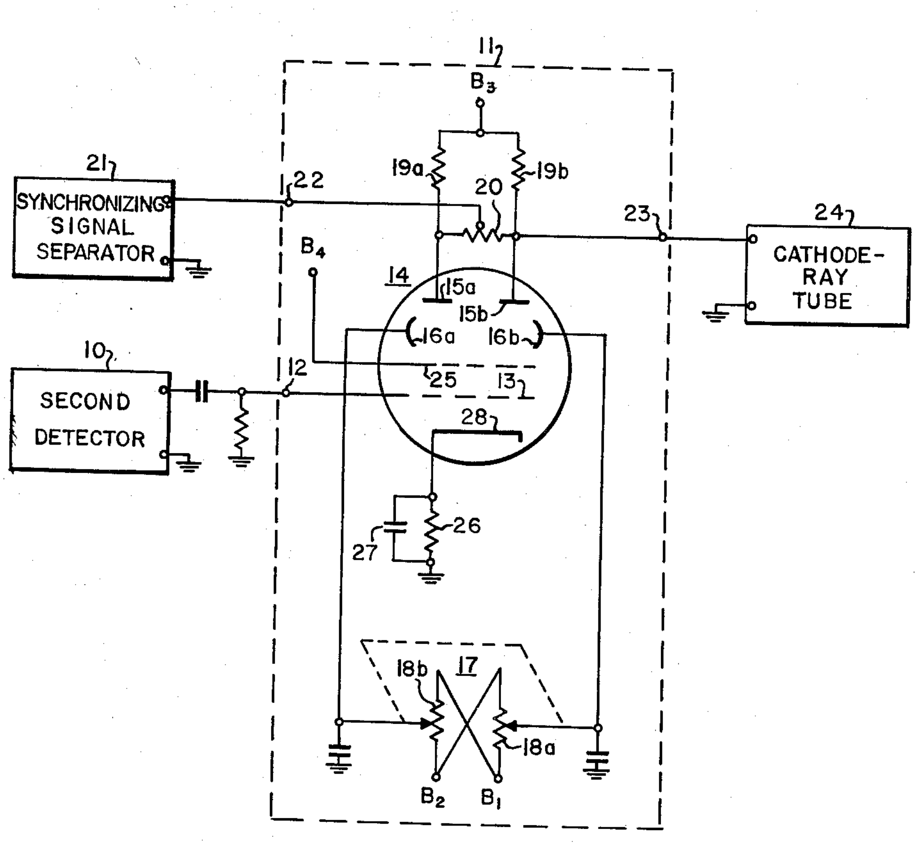

1

3,017,576

DUAL GAIN AMPLIFIER

John R. White, Westbury, N.Y., assignor to Hazeltine Research, Inc., a corporation of Illinois Filed May 6, 1959, Ser. No. 811,320
4 Claims. (Cl. 330—46)

*General*

This invention relates to an amplifier and, more particularly, to one which is capable of providing a fixed gain output at one output terminal and a variable gain output at another output terminal. While the invention has a particular application in a television receiver and will be described in such environment, it is obvious that its scope is not limited to such an application.

In a television receiver, the composite signal supplied by the second detector is composed of the video information and synchronizing signals. A synchronizing signal separator functions to separate the synchronizing signals from the video information. Normally, it is necessary to amplify the composite video signal prior to separating the video information and the synchronizing signals. To insure proper synchronization, the amplitude of the synchronizing signals must remain within fixed limits after amplification. On the other hand, it is desirable to have within the receiver means for varying the contrast of the picture. Variations in contrast are effected by variations in the amplitude of the video information. Normally, the contrast control is at the output of the video amplifier. At this point in the receiver, the synchronizing signals have not yet been separated from the video information, and the output from the video amplifier is the composite signal. Therefore, to satisfy both demands, namely, fixed amplitude synchronizing signals and varying amplitude video information, it is necessary to provide two outputs from the video amplifier. One output is connected directly to the synchronizing-signal separator, thus coupling to the synchronizing-signal separator a signal of fixed amplitude, and the other output is connected to the cathode-ray tube through some means which may be used to vary the amplitude of the output signal, thereby varying the contrast of the picture.

Usually the contrast control is simply a potentiometer connected to the output of the video amplifier. The loading effect of such a potentiometer causes the frequency response of the video amplifier to deteriorate. Also, if the contrast control is to be made accessible, the length of the wires from the output of the video amplifier to the contrast control and back to the video amplifier also adds to the deterioration effect.

It is, therefore, an object of the present invention to provide a new and improved amplifier.

It is another object of the present invention to provide a new and improved amplifier capable of providing a variable gain output and a fixed gain output.

It is still another object of the present invention to provide a new and improved amplifier, for a television receiver, capable of providing a variable gain output of video information and a fixed gain output of synchronization signals.

In accordance with a particular form of the present invention, an amplifier comprises means for supplying a first signal. Also included is amplifying means, responsive to the signal supplying means and including a current-conductive device having two output electrodes and control-electrode means for controlling the distribution of current between the output electrodes, for simultaneously deriving at the output electrodes signals representative of the first signal and dependent upon the current distribution to the respective electrode. The invention also includes means coupled to the output electrodes for deriving a signal representative of the first signal and dependent upon the total current of the current-conductive device. The invention additionally includes first utilization means coupled to the last-mentioned means and second utilization means coupled to one of the output electrodes, whereby the second utilization means is subjected to a variable gain representation of the first signal and the first utilization means is subjected to a fixed gain representation of the first signal.

2

For a better understanding of the present invention, together with other and further objects thereof, reference is had to the following description, taken in connection with accompanying drawing, and its scope will be pointed out in the appended claims.

The drawing shows an amplifier constructed in accordance with a particular embodiment of the present invention.

*Description of amplifier*

The drawing shows a particular embodiment of the present invention. The invention comprises means 10, such as the second detector of a television receiver, for supplying a signal to an amplifier 11 constructed in accordance with a particular form of the present invention. The signal from means 10 is supplied to a terminal 12 which, in turn, is connected to a control electrode 13 of a beam-deflection tube 14. The beam-deflection tube 14 also has two output electrodes **15*a* and 15*b*, two control electrodes 16*a* and 16*b*, and a cathode 28. The two control electrodes are connected to control means 17, which is composed of two mechanically ganged potentiometers 18*a* and 18*b*. The ends of both potentiometers 18*a* and 18*b* are connected to sources of fixed positive potential and fixed negative potential $B_1$ and $B_2$, respectively, in such a manner that when the wiper arms of the potentiometers are moved in either direction, as one wiper arm becomes more positive the other arm becomes more negative. The two output electrodes 15*a* and 15*b* are connected to a source of fixed positive potential $B_3$ through a pair of equal value resistors 19*a* and 19*b*. There is connected between the two output electrodes a resistor 20. A utilizing circuit 21, such as the synchronizing-signal separator, is connected to a terminal 22 which, in turn, is connected to a center tap on resistor 20. Output terminal 15*b* of beam-deflection tube 14 is connected to a terminal 23 which, in turn, is connected to another utilizing circuit 24, such as the cathode-ray tube. A screen electrode 25 of beam-deflection tube 14 is connected to a source of fixed positive potential $B_4$. A cathode resistor 26 is connected between the cathode 28 of beam-deflection tube 14 and ground and is by-passed by a capacitor 27**.

*Operation of amplifier*

The beam developed by the cathode in the tube 14 is intensity modulated by a first signal such as the composite video signal supplied to control electrode 13 and is directed to the output electrodes **15*a* and 15*b* through the deflection field of the control electrodes 16*a* and 16*b*. At the ouput electrodes there are simultaneously derived signals representative of the first signal. As the potential of the control electrodes 16*a* and 16*b* is varied, the current distribution to the output electrodes is also varied. As shown in the drawing, the wiper arms of the potentiometers 18***a* and 18*b* are in the center position. This results in equal potentials on the two control electrodes 16*a* and 16*b*, and the electron beam is evenly divided between the two output electrodes 15*a* and 15*b*. As the wiper arms are moved in either direction, one control electrode becomes more positive and the other becomes more negative. This causes the electron beam to be deflected toward that control electrode which becomes more positive and to be repelled by that control electrode which becomes more negative. The output electrode associated with the particular control electrode which attracts the beam receives more current and, therefore, the signal representative of the first signal at that output electrode is increased while the output electrode associated with in particular control electrode which repels the beam receives less current and the signal representative of the first signal at that output electrode is decreased. For example, if the wiper arms are moved such that control electrode 16*b* becomes more positive and control electrode 16*a* becomes more negative, the major portion of the electron beam impinges upon output electrode 15*b*. This causes an increase in the signal derived at output electrode 15*b* and a decrease in the signal derived at output electrode 15*a*. Therefore, by moving the wiper arms in either direction the signals derived at the output electrodes are either increased or decreased. Output electrodes 15*a* and 15*b* are each outputs of variable gain. Either one may be connected to the cathode-ray tube. By moving the wiper arms of potentiometers 18*a* and 18*b*, the signals derived at the output electrodes, representative of the composite video signal, vary in amplitude and the contrast of the picture is also varied.

It is apparent that the means used to vary the amplitude of the output signal does not cause the frequency response of the video amplifier to deteriorate. In addition, the length of wires from the control electrodes to the potentiometers may be made as long as necessary and will have no effect on the frequency response, since these wires carry a D.-C. voltage.

Assuming that the total current in the beam-deflection tube is constant and does not vary with variations in potential between the control electrodes, as the current is increased or decreased in one output electrode the current to the other output electrode decreases or increases. If the two load resistors 19*a* and 19*b* are equal, the voltage developed at the center tap of resistor 20 is independent of the fractional portions of the electron beam which impinge upon either of the output electrodes, but is rather dependent upon the total current of the tube. The center tap of resistor 20 is an output of fixed gain and may be connected to the synchronizing-signal separator. The amplifier of the present invention, therefore, provides an output of fixed gain and an output of variable gain simultaneously.

While applicant does not intend to limit the invention to any particular constants, the following values have been found suitable for the particular embodiment as shown in the drawing:

| | | |
|---|---|---|
| Tube **14** | | 6AR8 |
| Potentiometer **18***a* | kilohms | 25 |
| Potentiometer **18***b* | do | 25 |
| Resistor **19***a* | ohms | 4700 |
| Resistor **19***b* | do | 4700 |
| Resistor **20** | kilohms | 44 |
| Resistor **26** | ohms | 300 |
| Capacitor **27** | microfarads | 500 |
| Voltage $B_1$ | volts | +22½ |
| Voltage $B_2$ | do | −22½ |
| Voltage $B_3$ | do | +250 |
| Voltage $B_4$ | do | +250 |

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An amplifier comprising: means for supplying a first signal; an amplifying means, responsive to said signal supplying means and including a current-conductive device having two output electrodes and control-electrode means for controlling the distribution of current between the output electrodes, for simultaneously deriving at said output electrodes signals representative of said first signal and dependent upon the current distribution to the respective electrode; means coupled to said output electrodes for deriving a signal representative of said first signal and dependent upon the total current of said current-conductive device; first utilization means coupled to said last-mentioned means; and second utilization means coupled to one of said output electrodes; whereby said second utilization means is subjected to a variable gain representation of said first signal and said first utilization means is subjected to a fixed gain representation of said first signal.

2. An amplifier comprising: means for supplying a first signal; amplifying means, responsive to said signal supplying means and including a beam deflection tube having two output electrodes and control-electrode means for controlling the distribution of current between the output electrodes, for simultaneously deriving at said output electrodes signals representative of said first signal and dependent upon the current distribution to the respective electrode; means coupled to said output electrodes for deriving a signal representative of said first signal and dependent upon the total current of said beam deflection tube; first utilization means coupled to said last-mentioned means; and second utilization means coupled to one of said output electrodes; whereby said second utilization means is subjected to a variable gain representation of said first signal and said first utilization means is subjected to a fixed gain representation of said first signal.

3. A video amplifier for a television receiver comprising: means for supplying a composite video signal; amplifying means, responsive to said composite video signal supplying means and including a current-conductive device having two output electrodes and control-electrode means for controlling the distribution of current between the output electrodes, for simultaneously deriving at said output electrodes signals representative of said composite video signal and dependent upon the current distribution to the respective electrode; means coupled to said output electrodes for deriving a signal representative of said composite video signal and dependent upon the total current of said current-conductive device; a synchronizing signal separator coupled to said last-mentioned means whereby it is subjected to a fixed gain output of said amplifying means; and a video output circuit coupled to one of said output electrodes whereby it is subjected to a variable gain output of said amplifying means.

4. A video amplifier for a television receiver comprising: means for supplying a composite video signal; amplifying means, responsive to said composite video signal supplying means and including a current-conductive device having two output electrodes and control-electrode means for controlling the distribution of current between the output electrodes, for simultaneously deriving at said output electrodes signals representative of said composite video signal and dependent upon the current distribution to the respective electrode; means, including a resistor, coupled between said output electrodes for deriving a signal representative of said composite video signal and dependent upon the total current of said current-conductive device; a synchronizing signal separator coupled to said last-mentioned means whereby it is subjected to a fixed gain output of said amplifying means; and a video output circuit coupled to one of said output electrodes whereby it is subjected to a variable gain output of said amplifying means.

References Cited in the file of this patent

UNITED STATES PATENTS

| | | |
|---|---|---|
| 2,107,410 | Dreyer | Feb. 8, 1938 |
| 2,233,126 | Haeff | Feb. 25, 1941 |
| 2,265,311 | Preisach | Dec. 9, 1941 |
| 2,305,617 | Hansell | Dec. 22, 1942 |
| 2,650,956 | Heising | Sept. 1, 1953 |
| 2,832,847 | Goldstine | Apr. 29, 1958 |

FOREIGN PATENTS

| | | |
|---|---|---|
| 842,849 | France | Mar. 13, 1939 |